Patented Aug. 12, 1930

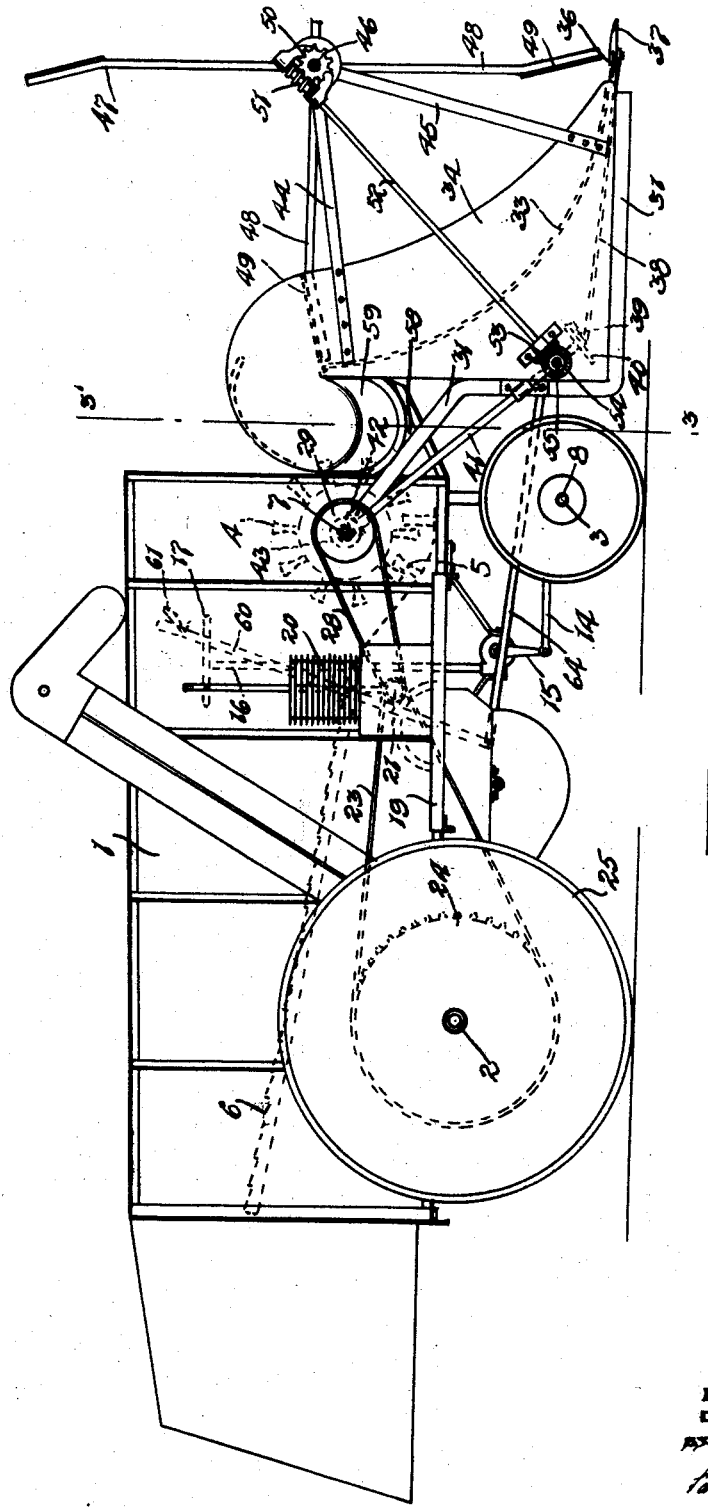

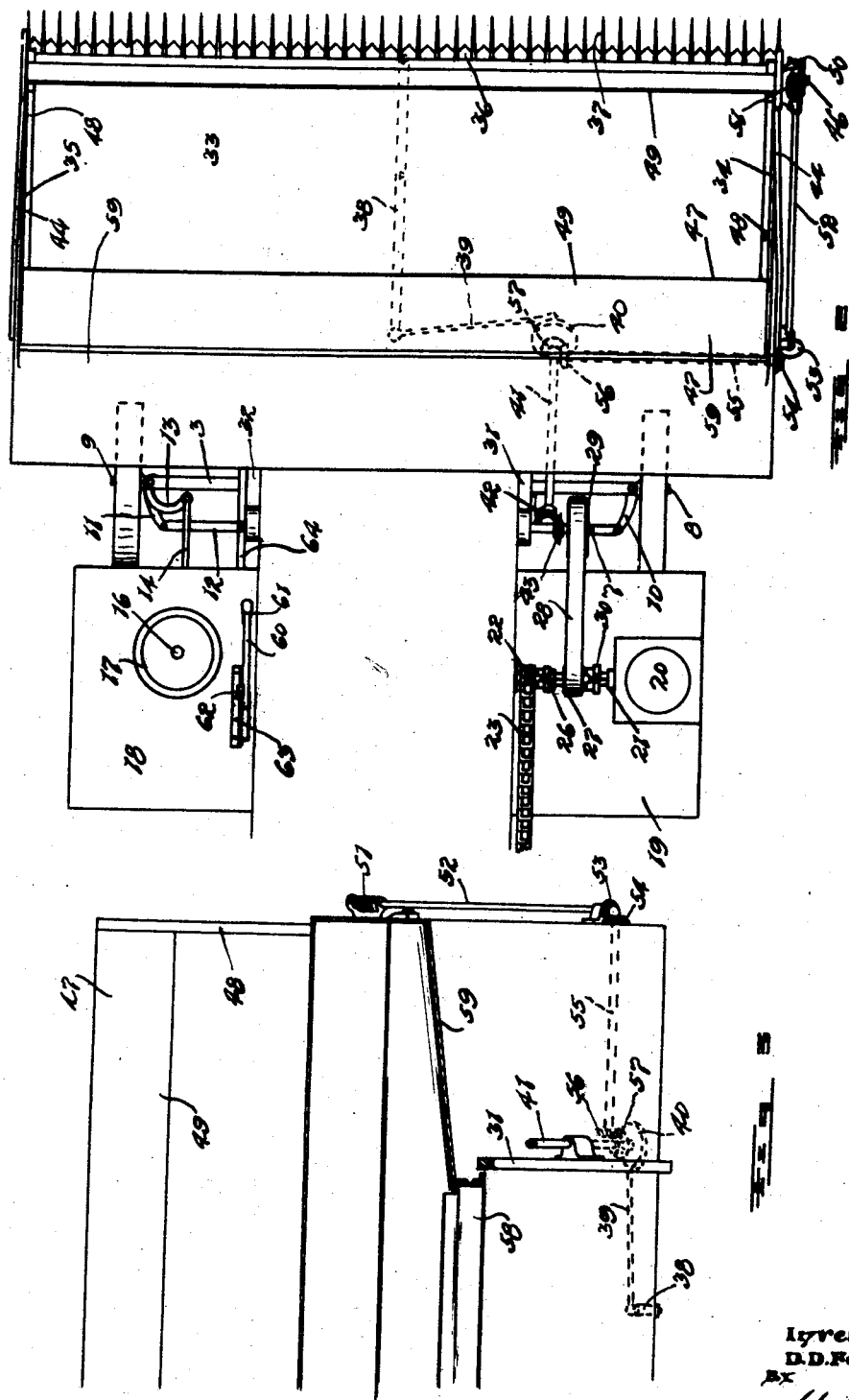

1,772,627

UNITED STATES PATENT OFFICE

DAVID D. FEHR, OF HASKETT, MANITOBA, CANADA

COMBINED HARVESTER AND THRASHER

Application filed March 28, 1927, Serial No. 179,146. Renewed January 2, 1930.

The invention relates to improvements in combined harvesters and thrashers and an object of the invention is to provide a machine which will cut the standing grain and subsequently thrash the same, the whole operation occurring as the machine advances over the field and further to arrange the machine such that the cutting bar is directly in front thereby obviating side draft.

A further object of the invention is to provide a machine which is driven by an engine which moves the machine over the ground as well as drives the operating parts and to arrange such that the operation of the various parts can be readily controlled by the attendant.

A further object of the invention is to provide a machine having a grain delivery pan to the rear of the cutting bar and a driven reel for sweeping the cut grain over the pan and a cylinder and concave at the rear end of the pan and receiving the grain therefrom.

A still further object of the invention is to construct the cutting bar, reel, pan and associated parts so that they can be simultaneously adjusted to vary the depth of cut and whilst delivering the cut grain to the cylinder in all adjusted positions.

With the above more important objects in view, the invention consists essentially in the arrangement and construction of parts hereinafter more particularly described, reference being had to the accompanying drawings, in which:—

Fig. 1 is a side view of the complete machine.

Fig. 2 is a plan view of the front end thereof.

Fig. 3 is a vertical sectional view at 3—3' Figure 1 and looking towards the reel.

In the drawings like characters of reference indicate corresponding parts in the several figures.

The main body 1 of the machine is mounted on a rear axle 2 and a front axle 3 and the body of the machine contains a toothed cylinder 4, a concave 5 co-operating therewith and a grain rack 6 rearwardly of the cylinder.

The cylinder is carried on the forwardly disposed, rotatably mounted, cylinder shaft 7 and as the toothed cylinder and the concave are of the well known type as employed in thrashing machines, I have not considered it necessary to give a detail description of the same. Further I have not considered it necessary to detail the rack 6 as the specific manner in which the grain is separated from the straw, chaff and so forth forms no part of the present invention.

The front wheels are arranged so that they can be steered and are mounted on stub axles 8 and 9 fitted with cranks 10 and 11, the cranks being pivotally connected together by a cross bar 12. A steering arm 13 is connected also to the axle 9. To the arm I pivotally attach the forward end of a steering rod 14, the rear end of which is controlled by a crank 15. A steering post 16 controls the movement of the crank 15, the steering post being provided with a hand wheel 17. A platform 18 is located at one side of the body and the steering post extends therethrough so that the operator can manipulate the hand wheel from the platform. I have not given a detailed description of the steering mechanism as it is of the well known automobile type.

A further platform 19 is located at the opposite side of the machine to that of 18 and on it, I mount a prime mover such as an internal combustion engine 20 and which has the drive shaft thereof indicated at 21. On the drive shaft, I mount a chain wheel 22 which is connected by a chain 23 to a chain wheel 24 associated with one of the rear traction wheels 25 which is mounted on the rear axle 2. A clutch indicated generally by the reference numeral 26 is provided to control the chain wheel 22 so that the rear wheel 25 can be driven as desired. On the shaft 21 I mount also a pulley 27 which is connected by a belt 28 to a further pulley 29 on the cylinder shaft 7. A controlling clutch 30 is also provided so that one can drive the pulley 29 as desired and in so doing operate the cylinder.

On the cylinder shaft I swivelly mount the rear ends of a pair of forwardly extending arms 31 and 32, these arms having their forward ends substantially horizontal and located so that they are fairly close to the ground. The arms, which are supported in the manner later described, carry a transversely extending pan 33 which is considerably longer than the width of the machine body and has the ends thereof closed by similar upstanding end plates 34 and 35.

At the forward edge of the pan, I locate a reciprocating cutting bar or knife 36 which is mounted in the customary guards 37. The knife is adapted to cut the grain standing in the field and after being cut, the grain falls onto the pan. The knife or cutting bar is actuated by a suitably pivoted, centrally disposed, lever 38, the forward end of which is connected to the knife and the rear end of which is connected by a pitman rod 39 to a disc 40 secured to the lower end of a counter shaft 41 suitably carried by the machine. The counter shaft is supplied at the upper end with a bevel gear 42 which meshes continuously with a driving gear 43 secured to the shaft 7.

According to the above arrangement, it will be apparent that the knife or cutter bar will be reciprocated when the cylinder is rotated.

The end plates 34 and 35 carry each a pair of arms 44 and 45, the arms of the pairs meeting forwardly and rotatably supporting a reel shaft 46. This shaft carries the reel 47 which is formed from a number of radiating arms 48 carrying gathering blades 49. The reel when rotated is adapted to have the blades thereof sweep over the pan 33 which is arranged concentric to the shaft 46. A worm wheel 50 is secured to the reel shaft and meshes continuously with a worm 51 located at the upper end of the worm shaft 52. The lower end of the worm shaft is provided with a bevel gear 53 which meshes continuously with a bevel gear 54 located at the outer end of a rotatably mounted, horizontally disposed shaft 55, the inner end of which is provided with a bevel gear 56 which meshes with a further bevel gear 57 secured to the shaft 41.

The forward end of the machine body is provided with an extending hopper 58 which is designed to feed the cut grain to the cylinder and concave. The hopper is of the same width as the machine body and as the pan is considerably longer than this width, I have provided inclined hopper extensions 59 at the ends of the hopper which are adjustable with the reel and pan and which are designed to receive the grain passed up the ends of the pan by the reel and deliver such grain to the hopper. In this way all the grain swept over the pan by the reel is delivered by gravity to the hopper and in the hopper, it gravitates to the cylinder and concave and accordingly will be thrashed thereby. After passing between the cylinder and the concave, the grain enters the rear part of the machine and is subsequently separated by any of the well known separating mechanisms customarily employed for the purpose.

As before mentioned, the arms 31 and 32 are supported so that they can be adjusted and in this connection, it will be readily observed that if the arms be swung such will effect the raising or lowering of the cutting bar and at the same time will effect a relative movement between the hopper extensions and the hopper. The extensions, however, lap the sides of the hopper so that there will be no opening appear at such points when the cutter bar is adjusted. The means provided for adjusting the arms is now described, it being understood that the pan and end plates form a rigid connection between the arms.

A lever 60 is pivotally mounted on the platform 18, the lever being provided with the customary hand latch 61 and detent 62, the detent operating over the quadrant 63 secured to the platform. The lower end of the lever which extends beneath the platform is connected pivotally by a bar 64 to the arm 32 and obviously the forward or back movement of the lever will effect the lowering or raising of the forward end of the arm and the consequent adjustment of the cutter bar in relation to the ground. The swinging movement of the arms 31 and 32 around the shaft 7 will cause a relative movement of the hopper extensions 59 in relation to the hopper 58 but such will be a relatively small shift as compared with the movement of the cutter bar and such is fully accommodated by lapping the inner ends of the hopper extensions in relation to the hopper ends as clearly shown in Figure 3.

It is to be particularly noticed that the cutter bar cuts the standing grain directly in advance of the machine and that the cut grain is delivered directly over the pan by the reel to the cylinder and concave and that all the working parts of the machine are directly under the control of the attendant. There is no side draft and the attendant can adjust the cutting bar as he sees fit.

When the machine is in operation, the cutter bar cuts the standing grain and the cut grain is passed upwardly over the pan by the reel and discharges into the hopper and hopper extensions and is passed directly to the cylinder and concave where it is thrashed. Subsequently the thrashed grain can be separated by any of the well known separating devices as customarily found in machines of this kind.

Whilst I have given a detailed description of the structure of the various parts, it is to be understood that these could be readily modified without departing from the spirit of the invention as set forth in the appended claims.

What I claim as my invention is:—
1. The combination with a separating ma- chine embodying a forwardly disposed cylinder and concave, of a horizontally disposed, vertically adjustable, transversely extending, reciprocating, cutting bar carried by the front end of the machine and in advance thereof and adapted to cut the standing grain on the field, a rotatably mounted driven reel overlying the cutting bar and a grain pan extending between the cutting bar and the front end of the separating machine and formed concentric to the reel and co-operating with the reel to pass the cut grain to the cylinder.

2. The combination with a portable driven separating machine embodying a forwardly disposed cylinder and concave, of an elevated transversely extending hopper feeding to the cylinder, a forwardly disposed transversely extending reciprocating cutter bar suspended from the front end of the machine and adapted to cut the grain standing on the field in advance thereof, a rotatably mounted reel operating over the cutting bar and an upwardly curving grain pan extending from the cutter bar to the hopper and underlying the reel and co-operating with the reel to pass the cut grain to the hopper.

3. The combination with a portable driven separating machine embodying a forwardly disposed cylinder and concave, of a horizontally disposed, transversely extending, vertically adjustable, and reciprocated cutting bar supported from the front end of the machine and positioned centrally in advance thereof and having a length considerably wider than the width of the machine, a stationary transversely extending grain receiving hopper located at the front end of the machine and feeding by gravity to the cylinder, a rotatably mounted and driven reel vertically adjustable with and overlying the cutting bar, an upwardly curving pan vertically adjustable with the reel and cutter bar and underlying the reel and co-operating with the reel to deliver the cut grain rearwardly towards the hopper and hopper extensions located at the rear end of the pan and positioned at the ends of the hopper and delivering into the hopper.

4. In a grain harvesting machine a cutter bar adjustable in respect to the ground over which the machine operates, a driven reel overlying the cutter bar and a grain elevating pan formed concentric to the reel and extending rearwardly and upwardly from the cutter bar and co-operating with the reel to discharge the cut grain rearwardly over the rear edge of the pan.

Signed at Morden in Manitoba this twenty-second day of February, 1927.

DAVID D. FEHR.